United States Patent
Bussard et al.

(10) Patent No.: US 9,632,846 B2
(45) Date of Patent: Apr. 25, 2017

(54) COMPLEX EVENT PROCESSOR FOR HISTORIC/LIVE/REPLAYED DATA

(71) Applicant: Microsoft Technology Licensing, LLC, Redmond, WA (US)

(72) Inventors: Laurent Bussard, Strasbourg (FR); Ivo José Garcia dos Santos, Munich (DE); Olivier Nano, Munich (DE); Tihomir Tarnavski, Sammamish, WA (US); Jonathan Goldstein, Woodinville, WA (US); Badrish Chandramouli, Redmond, WA (US); Lev Novik, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/677,633

(22) Filed: Apr. 2, 2015

(65) Prior Publication Data

US 2016/0292016 A1    Oct. 6, 2016

(51) Int. Cl.
*G06F 9/54*   (2006.01)
*G06F 17/30*  (2006.01)

(52) U.S. Cl.
CPC ............... *G06F 9/54* (2013.01); *G06F 9/542* (2013.01); *G06F 17/30516* (2013.01); *G06F 17/30548* (2013.01); *G06F 17/30551* (2013.01); *G06F 17/30575* (2013.01)

(58) Field of Classification Search
None
See application file for complete search history.

(56) References Cited

U.S. PATENT DOCUMENTS

| 5,539,749 | A  | 7/1996  | Eul           |
|-----------|----|---------|---------------|
| 7,117,278 | B2 | 10/2006 | Avery         |
| 7,668,856 | B2 | 2/2010  | Ganguly et al.|
| 8,214,408 | B2 | 7/2012  | Ramesh et al. |
| 8,543,534 | B2 | 9/2013  | Alves et al.  |

(Continued)

OTHER PUBLICATIONS

Fisher, et al., "Tempe: An Interactive Data Science Environment for Exploration of Temporal and Streaming Data", In Technical Report, Nov. 2014, 7 Pages.

(Continued)

*Primary Examiner* — Tuan Dao
(74) *Attorney, Agent, or Firm* — Lee & Hayes, PLLC (57) ABSTRACT

A complex event processor is described which has a communications interface configured to retrieve event data by pulling it from one or more sources and to receive at least one live event stream pushed to the interface. An event processing pipeline connected to the communications interface comprises a plurality of operator nodes connected between the communications interface and a combiner node which is a node configured to combine event data from the source and from the live event stream. The communications interface is configured to retrieve events from the source and to push the events retrieved from the source along the event processing pipeline towards the combiner node. The communications interface is configured to retrieve and push the retrieved events only in response to request messages passed in an upstream direction from the combiner node to the communications interface along the pipeline.

21 Claims, 8 Drawing Sheets

(56) References Cited

U.S. PATENT DOCUMENTS

| | | | |
|---|---|---|---|
| 2003/0002474 A1 | 1/2003 | Alexander et al. | |
| 2004/0070594 A1* | 4/2004 | Burke | H04N 21/4532 715/716 |
| 2008/0060034 A1 | 3/2008 | Egnal et al. | |
| 2008/0098169 A1* | 4/2008 | Kaluskar | G06F 17/30306 711/113 |
| 2009/0006954 A1* | 1/2009 | Jackson | G06F 17/30569 715/700 |
| 2010/0138405 A1 | 6/2010 | Mihaila et al. | |
| 2011/0093866 A1 | 4/2011 | Grabs et al. | |
| 2012/0054181 A1 | 3/2012 | Agarwala et al. | |
| 2012/0271921 A1 | 10/2012 | Gecer et al. | |
| 2012/0297490 A1* | 11/2012 | Barraclough | G06F 21/10 726/26 |
| 2012/0323941 A1* | 12/2012 | Chkodrov | G06F 17/30516 707/756 |
| 2012/0324453 A1 | 12/2012 | Chandramouli et al. | |
| 2013/0024418 A1* | 1/2013 | Sitrick | G06F 17/241 707/608 |
| 2013/0166712 A1 | 6/2013 | Chandramouli et al. | |
| 2013/0191185 A1 | 7/2013 | Galvin | |
| 2013/0325787 A1 | 12/2013 | Gerken et al. | |
| 2013/0325890 A1 | 12/2013 | Vaught | |
| 2014/0164059 A1* | 6/2014 | Dove | G06Q 30/0202 705/7.31 |
| 2014/0180566 A1 | 6/2014 | Malhotra | |
| 2014/0279764 A1 | 9/2014 | Lahr | |

OTHER PUBLICATIONS

Santos, et al., "DiAl: Distributed Streaming Analytics Anywhere, Anytime", In Proceedings of the VLDB Endowment, vol. 6, No. 12, Aug. 26, 2013, pp. 1386-1389.

Chaiken, et al., "Scope: Easy and Efficient Parallel Processing of Massive Data Sets", In Proceedings of the VLDB Endowment, vol. 1, No. 2, Aug. 2008, 12 pages.

Chandramouli, et al., "Trill: A High-Performance Incremental Query Processor for Diverse Analytics", In Proceedings of the VLDB Endowment, vol. 8, No. 4, Dec. 2014, 12 pages.

Chandramouli, et al., "The Trill Incremental Analytics Engine", In Technical Report, Apr. 2014, 14 pages.

"DocumentDB", Published on: Mar. 7, 2015, Avaliable at http://azure.microsoft.com/en-us/services/documentdb/.

"Event Processing with Esper and NEsper", Published on : May 11, 2011 Available at: http://esper.codehaus.org/.

"WSO2 Complex Event Processor", Published on: Oct. 24, 2012 Available at: http://wso2.com/products/complex-event-processor/.

Aitchison, Alastair, "Spatio-Temporal Event Processing with StreamInsight, SQL Server Denali, and Bing Maps—Part 1", Published on : Jul. 31, 2011 Available at: https://alastaira.wordpress.com/2011/07/31/spatio-temporal-event-processing-with-streaminsight-sql-server-denali-and-bing-maps-part-1/.

Lian, et al., "Complex Event Processing over LiveArchived Data Streams", Dec. 31, 2014 Available at: http://cjc.ict.ac.cn/eng/qwjse/view.asp?id=3521.

Suhothayan, et al., "Siddhi: A Second Look at Complex Event Processing", In Proceedings of the ACM Workshop on Gateway Computing Environments, Nov. 18, 2011, 8 pages.

"Red Hat JBoss BRMS", Dec. 31, 2014 Available at: http://www.jboss.org/products/brms/overview/?sc_cid=70160000000de4QAAQ.

Sheriff, et al., "A Comprehensive Framework for Complex Event Processing", In Proceedings of International Journal of Recent Advances in Engineering & Technology, vol. 1, Issue 3, Retrieved on : Dec. 31, 2014, 6 pages.

Qian, et al., "TimeStream: Reliable Stream Computation in the Cloud", In Proceedings of the 8th ACM European Conference on Computer Systems, Apr. 15, 2015, 14 pages.

Chandramouli, et al., "Physically Independent Stream Merging", In IEEE 28th International Conference on Data Engineering, Apr. 1, 2012, 12 pages.

Fernández, et al., "Inter-Operator Feedback in Data Stream Management Systems via Punctuation", In Proceedings of Fourth Biennial Conference on Innovative Data Systems Research, Jan. 4, 2009, 9 pages.

U.S. Appl. No. 14/486,638, Novik, et al., "Reference Data Semantic and Operators in Streaming Systems", filed Sep. 15, 2014.

Mazzucco, et al., "Merging Multiple Data Streams on Common Keys over High Performance Networks", In IEEE Conference Supercomputing, Nov. 16, 2002, 12 pages.

Kramer, et al., "Semantics and Implementation of Continuous Sliding Window Queries Over Data Streams", In Journal ACM Transactions on Database Systems, vol. 34, Issue 1, Apr. 2009, 49 pages.

Srivastava, et al., "Flexible Time Management in Data Stream Systems", In Proceedings of the Twenty-Third ACM SIGMOD-SIGACT-SIGART Symposium on Principles of Database Systems, Jun. 14, 2004, pp. 263-274.

Tucker, et al., "Exploiting Punctuation Semantics in Continuous Data Streams", in IEEE Transactions on Knowledge and Data Engineering, vol. 15, Issue 3, May 2003, pp. 555-568.

Li, et al., "Semantics and Evaluation Techniques for Window Aggregates in Data Streams", In Proceedings of the ACM SIGMOD International Conference on Management of Data, Jun. 14, 2005, pp. 311-322.

Barga et al. "Consistent Streaming Through Time: A Vision for Event Stream Processing", In Proceedings of Third Biennial Conference on Innovative Data Systems Research, Jan. 7, 2007, pp. 363-374.

Maier, et al., "Semantics of Data Streams and Operators", In Proceedings of the 10th International Conference on Database Theory, Jan. 5, 2005, 16 pages.

Johnson, et al., "A Heartbeat Mechanism and its Application in Gigascope", In Proceedings of the 31st International Conference on Very Large Data Bases, Aug. 30, 2005, pp. 1079-1088.

Li, et al., "Out-of-Order Processing: A New Architecture for High-Performance Stream Systems", In Journal of the VLDB Endowment, vol. 1, Issue 1, Aug. 2008, pp. 274-288.

Moctezuma, et al., "Inter-Operator Feedback in Data Stream Management Systems via Punctuation", In Proceedings of Fourth Biennial Conference on Innovative Data Systems Research, Jan. 4, 2009, 9 pages.

Hwang, et al., "Fast and Reliable Stream Processing over Wide Area Networks", In IEEE 23rd International Conference on Data Engineering Workshop, Apr. 17, 2007, pp. 604-613.

Ryvkina et al., "Revision Processing in a Stream Processing Engine: A High-Level Design", In Proceeding of 22nd International Conference on Data Engineering, Apr. 3, 2006, 3 Pages.

Hammad et al., "Nile: A Query Processing Engine for Data Streams", In Proceeding of 20th International Conference on Data Engineering, Mar. 30, 2004, 1 Page.

Abadi et al., "The Design of the Borealis Stream Processing Engine", In Proceedings of the CIDR Conference, Jan. 4, 2005, 13 Pages.

Babcock et al., "Models and Issues in Data Stream Systems", In Proceedings of the twenty-first ACM SIGMOD-SIGACT-SIGART symposium on Principles of database systems, Jun. 3, 2002, 16 Pages.

Xing et al., "Dynamic Load Distribution in the Borealis Stream Processor", In Proceedings of the 21st International Conference on Data Engineering, Apr. 5, 2005, 12 Pages.

Hwang et al., "High-Availability Algorithms for Distributed Stream Processing", In Proceedings of the 21st International Conference on Data Engineering, Apr. 5, 2005, 12 Pages.

Madden et al., "Continuously Adaptive Continuous Queries Over Streams", In Proceedings of the 2002 ACM SIGMOD international conference on Management of data, Jun. 3, 2002, pp. 49-60.

Botan et. al, "Secret: A Model for Analysis of the Execution Semantics of Stream Processing Systems", In Journal of VLDB Endowment, vol. 3, Issue 1-2, Sep. 1, 2010, pp. 232-243.

(56) References Cited

OTHER PUBLICATIONS

Yang, et al., "HybMig: A Hybrid Approach to Dynamic Plan Migration for Continuous Queries", In IEEE Transactions on Knowledge and Data Engineering, Mar. 2007, pp. 398-411.

Heinz et al., "Toward Simulation-Based Optimization in Data Stream Management Systems", In Proceeding of IEEE 24th International Conference on Data Engineering, Apr. 7, 2008, pp. 1580-1583.

Zhu et al., "Dynamic Plan Migration for Continuous Queries Over Data Streams", In Proceedings SIGMOD international conference on Management of data, Jun. 13, 2004, 12 Pages.

Palmer, Mark, "The StreamBase Event Processing Blog", Published on: Mat 14, 2013 Available at: http://streambase.typepad.com/streambase_stream_process/2013/05/liveview-and-historical-data-access.html.

"The .NET Programmer's Playground", Apr. 2, 2015 Available at: http://www.linqpad.net/.

Chandramouli, et al., "Streams", Retrieved on: Apr. 2, 2015 Available at: http://research.microsoft.com/en-us/projects/streams.

Lomet, et al., "Transaction Time Support Inside a Database Engine", In Proceedings of the 22nd International Conference on Data Engineering, Apr. 3, 2006, 12 pages.

Kriegel, et al., "Managing Intervals Efficiently in Object-Relational Databases", In Proceedings of the 26th International Conference on Very Large Data Bases, Sep. 10, 2000, 12 pages.

Cugola, et al., "Processing flows of information", In Proceedings of the ACM Computing Surveys, vol. 44, Issue 3, Jun. 14, 2012, pp. 1-70.

"International Search Report and Written Opinion Issued in PCT Application No. PCT/US2016/025455", Mailed Date: Jul. 5, 2016, 11 Pages.

Tucker, et al. "Using Punctuation Schemes to Characterize Strategies for Querying over Data Streams", In Proceedings of the IEEE Transactions on Knowledge and Data Engineering, vol. 19, No. 9, Sep. 1, 2007, pp. 1227-1240.

\* cited by examiner

COMPLEX EVENT PROCESSOR FOR HISTORIC/LIVE/REPLAYED DATA

BACKGROUND

Complex event processing involves accessing streams of event data from different sources, and combining and analyzing the data to compute outputs that may be used to control downstream systems or for other purposes. Complex event processing systems apply one or more queries to the streams of event data to retrieve data from the streams and compute results.

The embodiments described below are not limited to implementations which solve any or all of the disadvantages of known complex event processing systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A complex event processor is described which has a communications interface configured to retrieve event data from at least one source and to receive data pushed to the communications interface comprising at least one live/replayed event stream. An event processing pipeline connected to the communications interface comprises a plurality of operator nodes connected between the communications interface and a combiner node which is a node configured to combine event data retrieved from the source and data pushed from the live/replayed event stream. The communications interface is configured to retrieve events from the source and to push the events retrieved from the source along the event processing pipeline in a downstream direction from the communications interface towards the combiner node. The communications interface is configured to retrieve and push the retrieved events only in response to request messages passed in an upstream direction from the combiner node to the communications interface along the pipeline.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
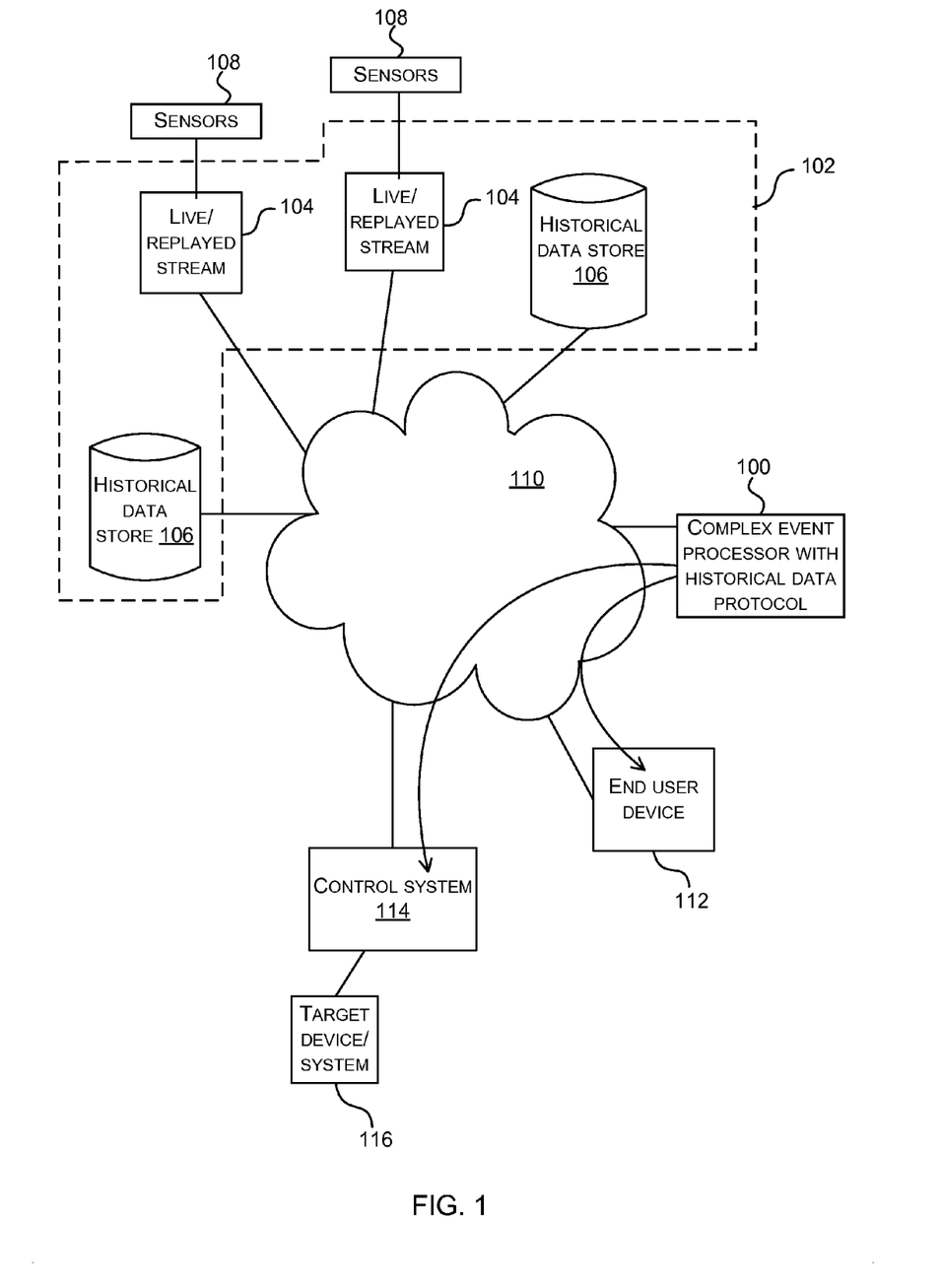
FIG. 1 is a schematic diagram of a complex event processor with a historical data protocol in communication with live/replayed data streams and historical data sources.

FIG. 1 is a schematic diagram of a complex event processor 100 which implements a historical data protocol. The complex event processor 100 is in communication with live/replayed event streams 104, which push data to the complex event processor and one or more event sources from which data is to be pulled such as historical event stores 106. An historical event store is any computer accessible record of timestamped event data and the example of FIG. 1 shows historical event stores although it is also possible to use any event sources from which the complex event processor is to pull data. In the examples described below, complex event processors pull data from historical event stores for the sake of example. However, it is not essential to use historical event stores, any type of event source from which data is pulled by the complex event processor may be used.

In addition to being able to pull event data from one or more sources, the complex event processor receives event data which is pushed to it, for example, from a live or replayed event stream. A live event stream 104 may be from any entity which outputs a live stream of timestamped event data such as sensor readings, or other event data to communications network 110 in a form accessible to the complex event processor 100. Timestamps on the live event stream may be either explicit (i.e. provided by the original source), or implicit (i.e. added by the processor ingress, for example, based on wall-clock system time). A replayed event stream is a stream of timestamped event data which has been observed and recorded and is replayed in the same form as it was observed. A non-exhaustive list of examples of sources of live or replayed data streams 104 is: a smart home heating meter in a domestic home, a light sensor in a vehicle, a medical sensor on a patient, a GPS sensor in a smart phone, a telecommunications network node outputting sensed traffic event data, a manufacturing control server outputting sensor data from a manufacturing plant control system, an information retrieval engine outputting search event data, and others.

The complex event processor 100 comprises functionality for querying the live/replayed event streams 104 and historical event stores 106 (or other sources) in order to access data from those sources and compute outputs. The live/replayed event streams 104 and historical event stores 106 can be thought of as forming a database 102 which is queried by the complex event processor. The event data in the database 102 is timestamped and may be stored as point event data and/or interval event data. Point event data comprises timestamped sensor readings, and optional sensor type indicators, addresses or references. The timestamps are single times such as application times, being times of a software application controlling sensors 108 which observed, generated or recorded the sensor readings. Interval event data comprises data about sensor readings observed during a time interval, and two edge timestamps for each interval event, recording the start and end of the interval.

The complex event processor 100 comprises a plurality of operator nodes which carry out processing to query the database 102 comprising the historical event stores 106 and the live/replayed event streams 104. The complex event processor 100 implements a communications protocol for communicating between the operator nodes in such a manner as to enable historical event data to be efficiently and accurately combined with live or replayed event stream data in a manner which takes into account the timestamps of the live or replayed event stream data and the timestamps of the historical event data. Rather than replaying all data from an historical data source 106 and waiting to obtain historical event data with timestamps meeting particular criteria, the protocol enables relevant historical event data to be pushed into the complex event processor at the time it is needed. In this way live or replayed event stream data is combined with historical event data in an efficient and accurate manner. The complex event processor is able to more efficiently query the database comprising the live/replayed event streams 104 and the historical event stores 106. It computes query results which are output to downstream systems such as control system 114 or end user device 112. The control system 114 may use the query results to control a target device or system 116 such as a domestic heating system, medical apparatus, communications network or other.

The complex event processor is computer implemented using software and/or hardware. For example, the complex event processor may be implemented in a data center, using a plurality of servers in a server farm, using one or more web servers, or in other ways. Each operator node may be implemented using a separate computing entity such as a virtual machine, or physical machine. In other examples, the operator nodes are implemented at the same computing entity.

Figure 2:
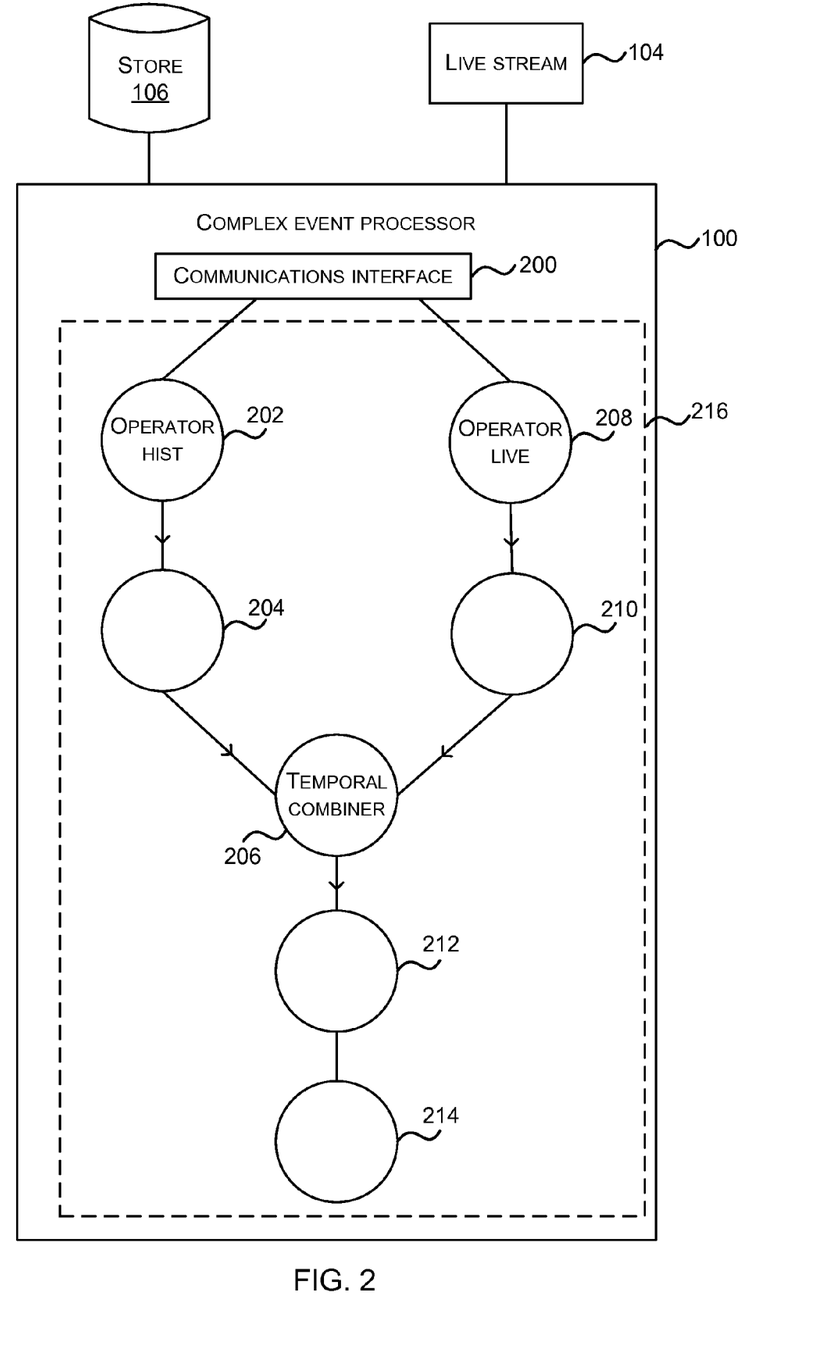
FIG. 2 is a schematic diagram of a complex event processor in more detail.

FIG. 2 is a schematic diagram of a complex event processor 100 comprising a communications interface 200 and at least one query plan 216. In this example one query plan 216 is shown although in practice many query plans may be used and these may be more complex than the simple query plan illustrated in FIG. 2. A query plan comprises a processing pipeline for implementing a query to extract data from at least one live or replayed event stream 104 and at least one historical event store 106, and to compute an output from the extracted data. In this example, a query plan is represented as a plurality of nodes 202, 204, 206, 208, 210, 212, 214 of a directed graph which has no loops. Each node is an operator node, representing computing functionality for computing an operation such as filtering data, aggregating data, calculating statistics, detecting patterns, removing outliers, smoothing, or other operations. At least one of the nodes is a combiner node 206 which computes an output which combines data from at least one live or replayed stream 104, and from the historical event store 106. The term "combine" is used to refer to any join, temporal join, or union of event data from at least two different sources. The combiner node is a temporal combiner which is a combiner that takes into account timestamps of the event data it combines. For example, by computing a difference between event data on a live or replayed stream, with historical event data having timestamps during a time period specified in relation to timestamps of the live or replayed event data. This makes it possible to enrich a live or replayed stream with historical data.

A query plan may be preconfigured at the complex event processor by a software developer and using an historical data protocol which enables historical event data to be retrieved from historical event store 106.

Figure 3:
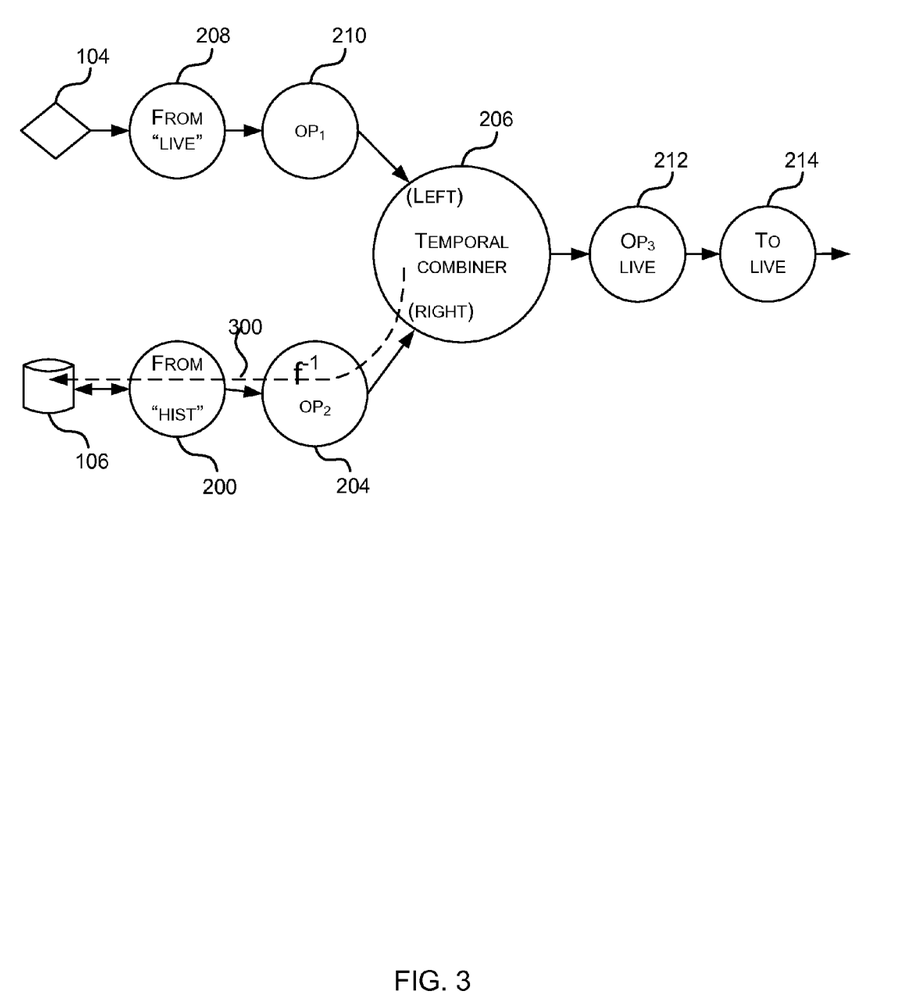
FIG. 3 is a schematic diagram of a query plan of a complex event processor.

FIG. 3 is a schematic diagram of the query plan of FIG. 2 in more detail. Live or replayed event data is input to operator node 208 which forwards that event data to operator node 210. Operator node 210 calculates a specified operation on the live or replayed event data, such as denoising, and passes the resulting event data to temporal combiner 206.

Temporal combiner node 206 is configured to carry out a temporal combination operation on the event data it receives from the live or replayed source, with event data from historical event store 106. However, data from historical event store 106 is not simply replayed as this would be time consuming and take significant communications resource to access data from historical event store 106 which may be remote and large. Data from historical event store 106 is pushed into operator node 200 and then flows down the pipeline to the temporal combiner node 206, with operations being computed at operator nodes 200 and 204. The part of the pipeline through which the historical events pass may be referred to as a historical event pipeline.

The pushing of the historical event data occurs only in response to request messages, referred to herein as reverse punctuation messages, which are passed in an upstream direction (indicated by arrow 300) from temporal combiner node 206 to the communications interface 200 interfacing to the historical event store. The reverse punctuation messages are sent at appropriate times, so that the historical event data they provoke is injected into the query plan just in time to reach temporal combiner 206 so as to be available at the combiner node 206 at the same time as appropriately timestamped event data from the live or replayed stream.

When event data flows down the pipeline to the temporal combiner node 206, operations are computed at operator nodes, such as nodes 200 and 204. An operation at an operator node may use former data to compute an output. For instance, computing the average temperature during the last minute requires one minute of data. As a result an operator node arranged to compute the average temperature at time t needs to get data from time t−60 seconds. In some examples, intermediate operator nodes store inverse functions (for example as illustrated in FIG. 3 at node 204 by the symbol $f^{-1}$, which take as input a time and output the time adjusted by an amount related to the time manipulation of an operation implemented by the operator node. The inverse functions may be selected from a library of inverse functions according to the type of operation implemented at the operator node. More detail about inverse functions is given later in this document.

Temporal combiner node 206 computes any suitable combination of the event data and outputs the result, as live event data, to operator node 212. Operator node 212 passes its result to node 214 which may store the result or output the live result to a downstream system.

A reverse punctuation message is a message which requests event data from an historical event store. A reverse punctuation message comprises one or more times to be used to retrieve data from the historical event store, and optionally a number of events to be retrieved from the historical event store. Additional non-temporal properties of expected events can be communicated via the reverse punctuation channel. For instance, only events with a given key may be requested. The operator nodes which are between the communications interface 200 and the temporal combiner 206 (referred to as intermediate nodes) each know the address or reference of the next upstream operator node to which reverse punctuation messages are to be sent. The intermediate nodes may modify the one or more times in the reverse punctuation message. The intermediate nodes may modify the reverse punctuation message by changing the number of events to be retrieved from the historical event store. This is described in more detail below.

In the example of FIG. 3 the words "left" and "right" in node 206 are an example where "left" denotes a live stream and "right" denotes an historical stream. However, this is an example only. It is also possible for "left" to denote historical and "right" to denote live.

Figure 4:
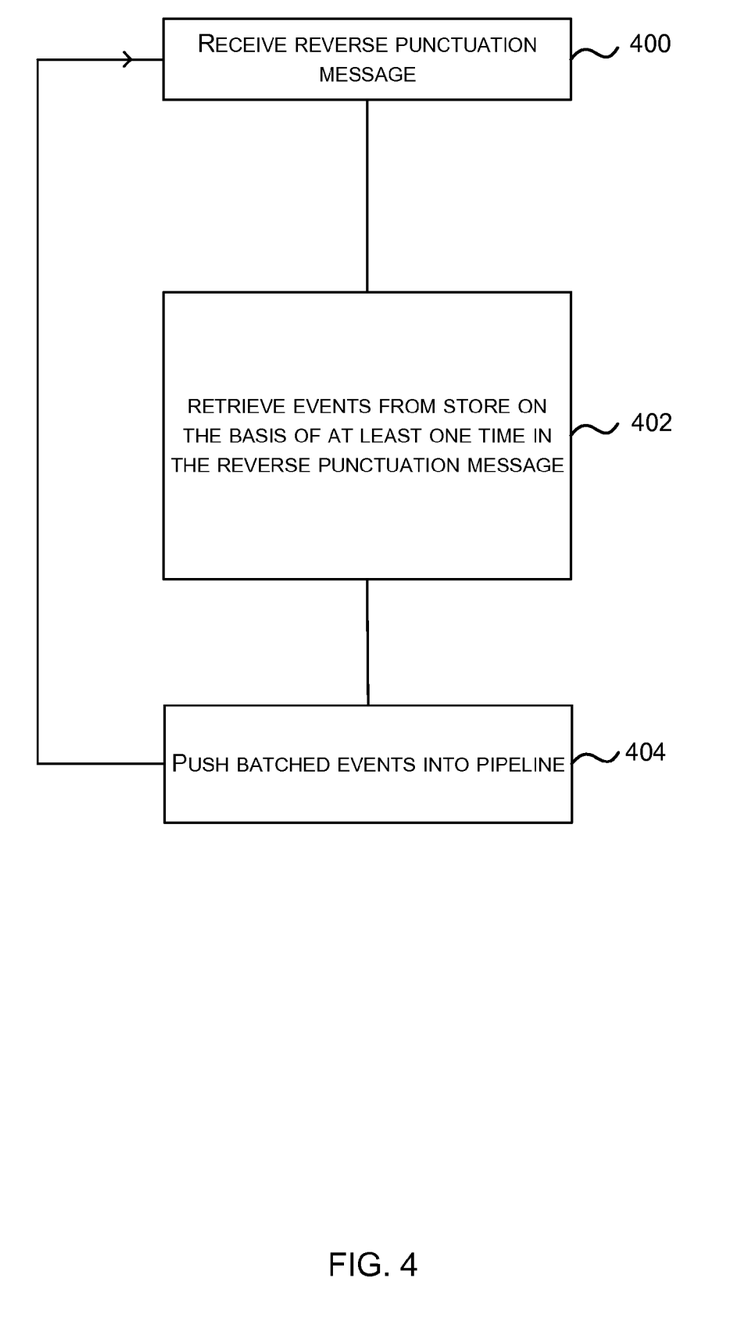
FIG. 4 is a flow diagram of a method at a communications interface of a complex event processor.

FIG. 4 is a flow diagram of a method at the communications interface 200 which interfaces to the live/replayed event stream and to the historical event store. The communications interface receives 400 a reverse punctuation message. The reverse punctuation message comprises one or more times. For example, it may comprise a single time in the case that point events are stored in the historical event store. Where the historical event store holds interval events, the reverse punctuation message may comprise at least two times, a beginning edge event time (referred to as a start time) and an end edge event time (referred to as an end time) of a time interval. The communications interface uses the one or more times in the reverse punctuation message to retrieve 402 historical event data from the historical event store. For example, where the historical event store is a database of timestamped point event data it may use a timestamp index of the database to quickly and efficiently retrieve historical event data with timestamps matching the time(s) in the reverse punctuation message. For example, where the historical event store is a database of timestamped point event data and interval event data, it may use an interval index to efficiently retrieve events overlapping the time specified in the reverse punctuation. The historical source may be configured to keep track of events already sent to avoid duplications. The historical source may handle storage of interval events as one event with two timestamps (e.g. one row in a database) or as two edge events with one timestamp each respectively representing the start and the end of the interval (e.g. two rows in a database).

The communications interface forms the retrieved historical event data into batches. For example, if a batch is not filled, the communications interface waits for the next reverse punctuation message, retrieves more data from the historical event store as a result, and fills the batch. The batches of events are pushed 404 into the pipeline of the query plan and the process repeats as indicated in FIG. 4. method at historical event source. Note that events are usually sent as batches but can be sent one by one when required.

In an example, the communications interface receives a request comprising at least one time and, in response to the request, it retrieves events from an event store where the events have timestamps related to the at least one time; and the communications interface pushes the retrieved events into a historical event pipeline of a complex event processor.

Figure 5:
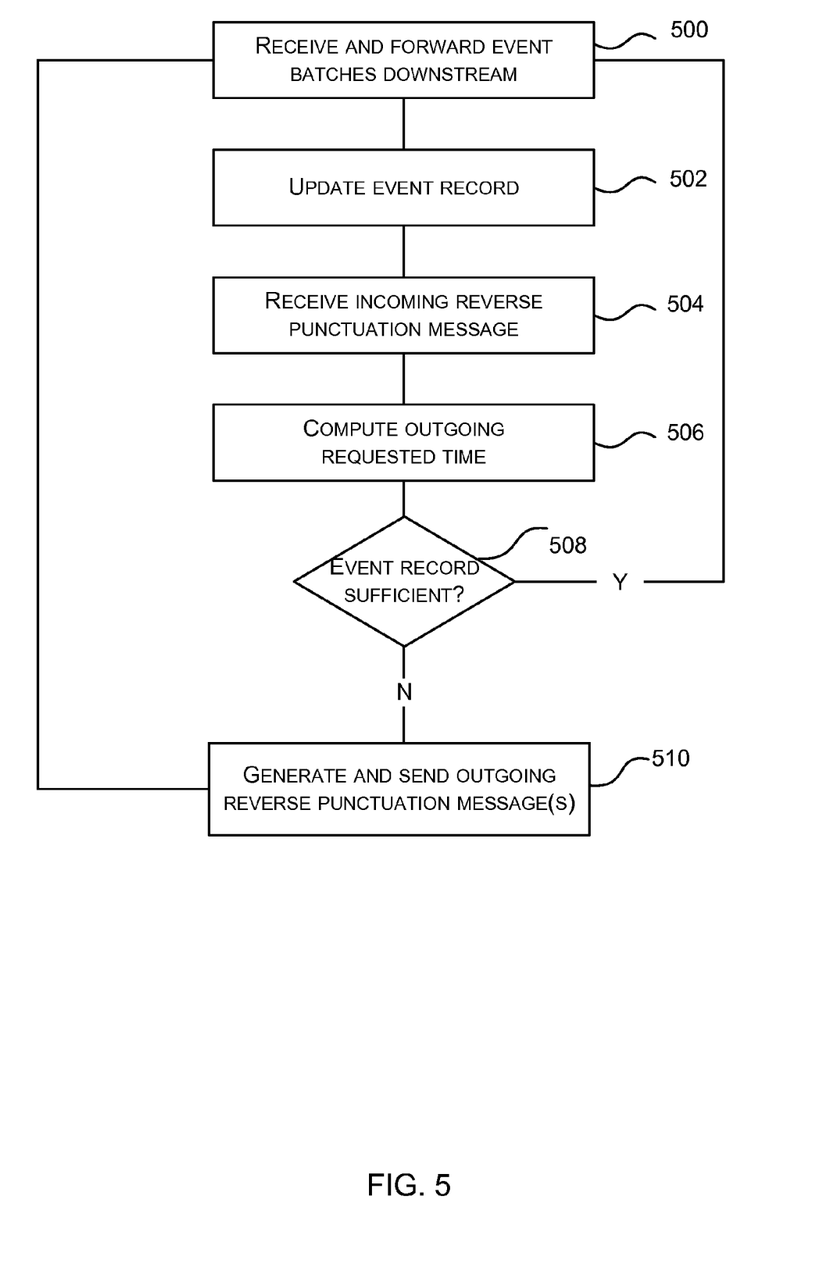
FIG. 5 is a flow diagram of a method at an operator node of a complex event processor using batches of point events.

FIG. 5 is a flow diagram of a method at an intermediate node such as node 200 or node 204. In this example the historical event store holds point events but not interval events. The intermediate node receives and forwards 500 event batches in a downstream direction along the query plan from the communications interface towards the temporal combiner node. The intermediate node updates 502 an event record that it holds. The event record holds a copy of events which have recently arrived at the intermediate node. The intermediate node receives 504 an incoming reverse punctuation message in an upstream direction from the temporal combiner node towards the communications interface. The incoming reverse punctuation message comprises one or more times as explained above. The intermediate node optionally computes 506 one or more outgoing requested times. For example, the intermediate node uses an inverse function, as described above, to compute the outgoing requested time(s) from the incoming reverse punctuation message. In this way any time and/or duration introduced by the intermediate node in a downstream direction (towards the temporal combiner node) may be taken into account.

The intermediate node now has an outgoing requested time (or times) and, in some examples, it has an amount of event data to be retrieved (from the reverse punctuation message). The intermediate node checks 508 its event record to see if it already has event data with timestamps fitting criteria related to the outgoing requested time. Where an amount is specified in the reverse punctuation message, the intermediate node checks 508 if it has enough such data in its event record. If the check or checks are successful, the process returns to step 500 of receiving and forwarding event batches. Otherwise, the intermediate node has to request more historical event data, by generating and sending 510 one or more outgoing reverse punctuation message(s).

In an example, a method at any of a plurality of operator nodes of a complex event processing pipeline comprising at least one historical event source and at least one live or replayed event source comprises:

receiving a reverse punctuation message from one of the operators which is subsequent in the pipeline in a downstream direction from the historical event source to a combiner node, the reverse punctuation message comprising at least a first requested time;

computing a second requested time from the first requested time using an inverse function; and sending another reverse punctuation message comprising the second requested time to another operator node of the pipeline in an upstream direction towards the historical event source.

Figure 6:
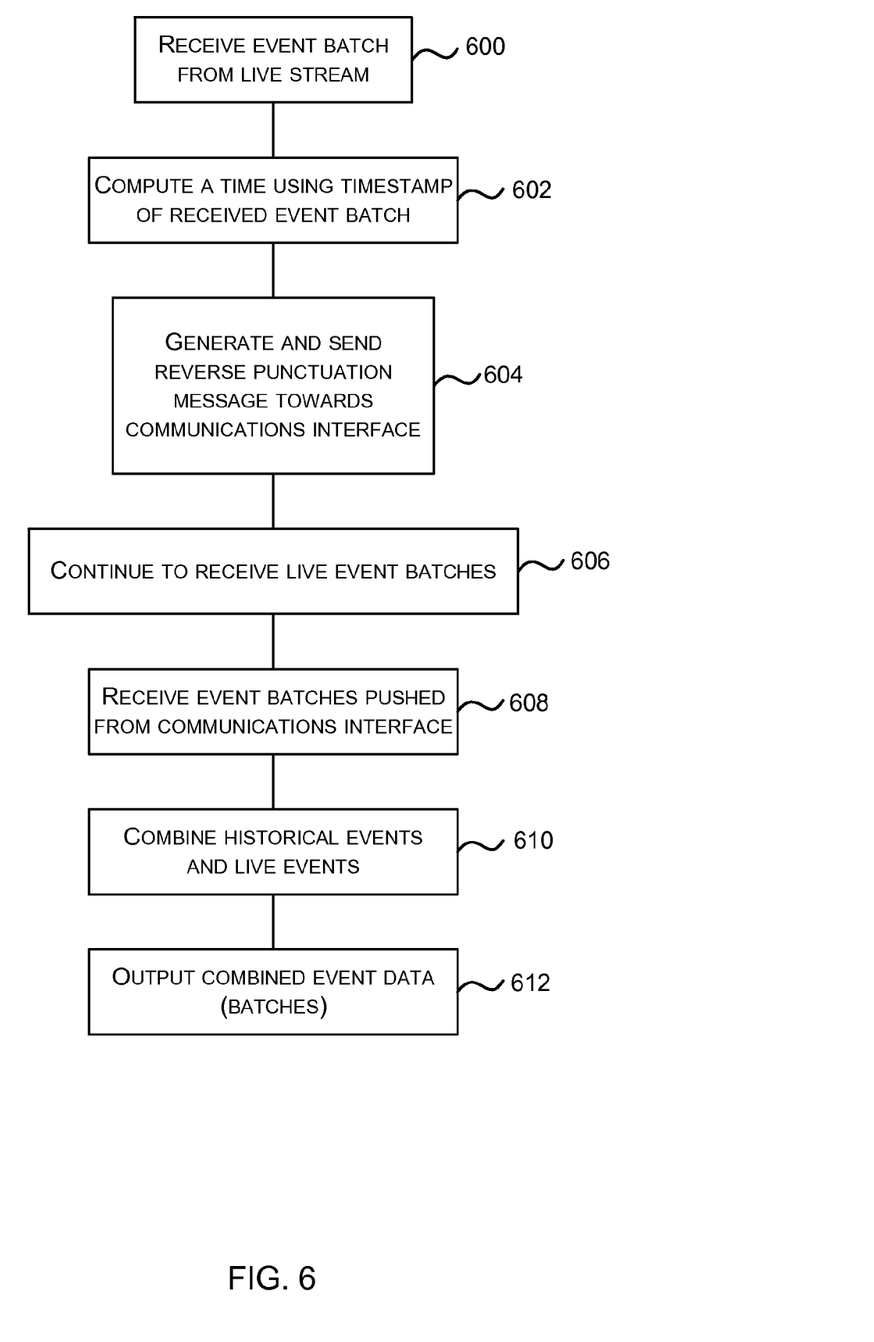
FIG. 6 is a flow diagram of a method at a combiner of a complex event processor using batches of point events.

FIG. 6 is a flow diagram of an example method at a temporal combiner node. The temporal combiner node receives 600 an event batch from at least one live event stream or replayed event stream. Receipt of the event batch is used to drive generation and sending of a reverse punctuation message as now described.

The temporal combiner node computes 602 one or more times using the timestamp of event data in the received event batch. These times are to be used to retrieve event data from the historical event store. For example, the temporal combiner node stores a function for combining data in a manner which takes into account timestamps of the data to be combined. This function may be used, together with the timestamp of event data in the received batch, to compute the time. In an example, the temporal combiner node computes a union of historical event data that is one week old with the currently received live/replayed event data. In another example, the temporal combiner node computes a difference between historical event data that is one year old as compared with the currently received live/replayed event data. In another example, the temporal combiner node computes an average of a current month of live/replayed event data and historical event data in the same month one year ago.

The temporal combiner generates and sends 604 a reverse punctuation message towards the communications interface. The reverse punctuation message comprises an address or reference of an historical event store. It also comprises the computed time(s) to be used to retrieve event data from the historical store.

The temporal combiner node continues to receive 606 live/replayed event batches (and to generate and send reverse punctuation messages). It also receives 608 batches of historical events pushed from the communications interface in response to the reverse punctuation message(s). When the temporal combiner node has the live/replayed event data and the historical event data needed for the combination (as specified by its function) it applies its function to the event data and computes 610 an output. The combined event data is output 612 optionally in batches.

In an example, a method at a combiner node comprises receiving events from a live/replayed event stream; using the received events to compute one or more times to be used for accessing historical event data from a historical event source; and sending a reverse punctuation message comprising the computed time(s) to an operator node of an historical event pipeline connecting the combiner node to a communications interface that interfaces with the historical event store.

Figure 7:
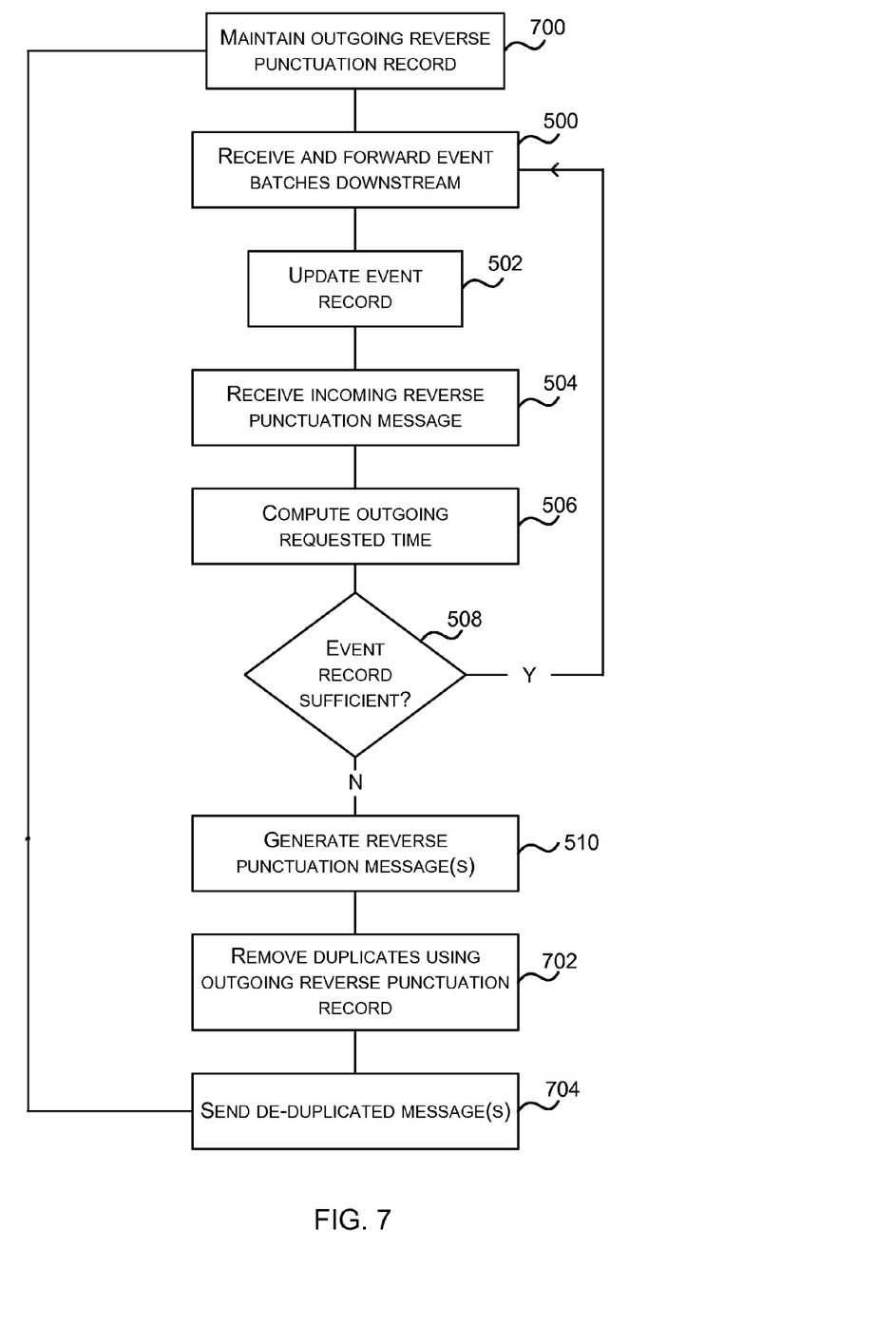
FIG. 7 is a flow diagram of a method at an operator node of a complex event processor using batches of point or interval events.

FIG. 7 is a flow diagram of a method at an intermediate node in the case that both point and interval events are supported. In this case the historical event store holds both point events and interval events. FIG. 7 is similar to FIG. 5 and the same reference numerals are used to refer to the same steps.

The intermediate node maintains 700 an outgoing reverse punctuation record. This is a record of reverse punctuation messages that the intermediate node has recently sent. The intermediate node receives and forwards 500 event batches in a downstream direction along the query plan from the communications interface towards the temporal combiner node. The intermediate node updates 502 an event record that it holds. The event record holds a copy of events which have recently arrived at the intermediate node. The intermediate node receives 504 an incoming reverse punctuation message in an upstream direction from the temporal combiner node towards the communications interface. The incoming reverse punctuation message comprises one or more times as explained above. The intermediate node optionally computes 506 one or more outgoing requested times. For example, the intermediate node uses an inverse function, as described above, to compute the outgoing requested time(s) from the incoming reverse punctuation message. In this way any time and/or duration introduced by the intermediate node in a downstream direction (towards the temporal combiner node) may be taken into account.

The intermediate node now has an outgoing requested time (or times) and, in some examples, it has an amount of event data to be retrieved (from the reverse punctuation message). The intermediate node checks 508 its event record to see if it needs more inputs to compute outputs with criteria related to the outgoing requested time. Where an amount is specified in the reverse punctuation message, the intermediate node checks 508 if it has enough such data in its event record. If the check 508 is successful, the process returns to step 500 of receiving and forwarding event batches. Otherwise, the intermediate node has to request more historical event data, by generating 510 one or more outgoing reverse punctuation message(s).

The intermediate node may avoid duplicated reverse punctuation message(s) by checking 702 its outgoing reverse punctuation record. It then sends the de-duplicated reverse punctuation messages in an upstream direction towards the communications interface. The process then returns to step 700 with an update of the reverse punctuation record. In the case that interval events are supported, the use of a reverse punctuation record to remove duplicates in this way improves efficiency of operation.

More detail about inverse functions used by the operator nodes in some examples, is now given. An inverse function takes as input one or more times from an incoming reverse punctuation message. It computes a new time for each of the times it receives so as to allow for time taken by the operator node itself to compute its operation on incoming historical event data. For example, suppose the operator node computes an average of incoming historical event data having timestamps falling in 10 minute time intervals. The inverse function will subtract 10 minutes from the time requested in the reverse punctuation message and request enough events to fill this 10 minute window.

For the following types of operators inverse functions are available and may be specified in advance by a software developer, may be selected automatically from a library of inverse functions, or may be computed automatically by a static analysis:
  operators which do not alter the timestamp of events,
  operators with constrained time manipulation,
  merging operators,
  regrouping operators,
  multicasting operators.

For operators where inverse functions are not possible such as stateful operators and operators altering lifetime on a non-temporal basis (e.g. a data-dependent windowing operator), then a policy is defined such as generating a fail message or reading events from the historical event store with the earliest timestamps available (reading from the beginning of time).

It is also possible for a static analysis of the historical event processing pipeline to be carried out prior to operation of the complex event processor. The static analysis may access the inverse functions of the operator nodes of the historical event pipeline and aggregate these to compute one or more rules and/or criteria to be used by the communications interface for retrieving historical event data from the historical event source. The static analysis may compute amounts and/or timestamp criteria to be used by the communications interface for retrieving historical event data. The results of the static analysis comprising the rules and/or criteria are available to the communications interface at runtime so that the communications interface is able to access appropriate historical event data and push that into the historical event pipeline during execution of the query plan. In this case reverse punctuation messages are not handled by the operator nodes themselves but directly between sources.

It is also possible to use a combination of the static analysis and reverse punctuation message approaches. For example, the static analysis may take into account some of the operator nodes of the historical event pipeline and reverse punctuation messages may be used by others of the operator nodes of the historical event pipeline. In this case, operator nodes which are taken into account in the static analysis may simply pass on any reverse punctuation messages they receive. Additionally, static analysis can be used to replace part of the operators in the historical part of the pipeline by more sophisticated requests to the data store. For instance, a filter operator in the historical part of the pipeline can be replaced by a more precise request to the store, the request retrieving data satisfying the filter's condition.

Alternatively, or in addition, the functionality of any one or more of the operator nodes described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 8:
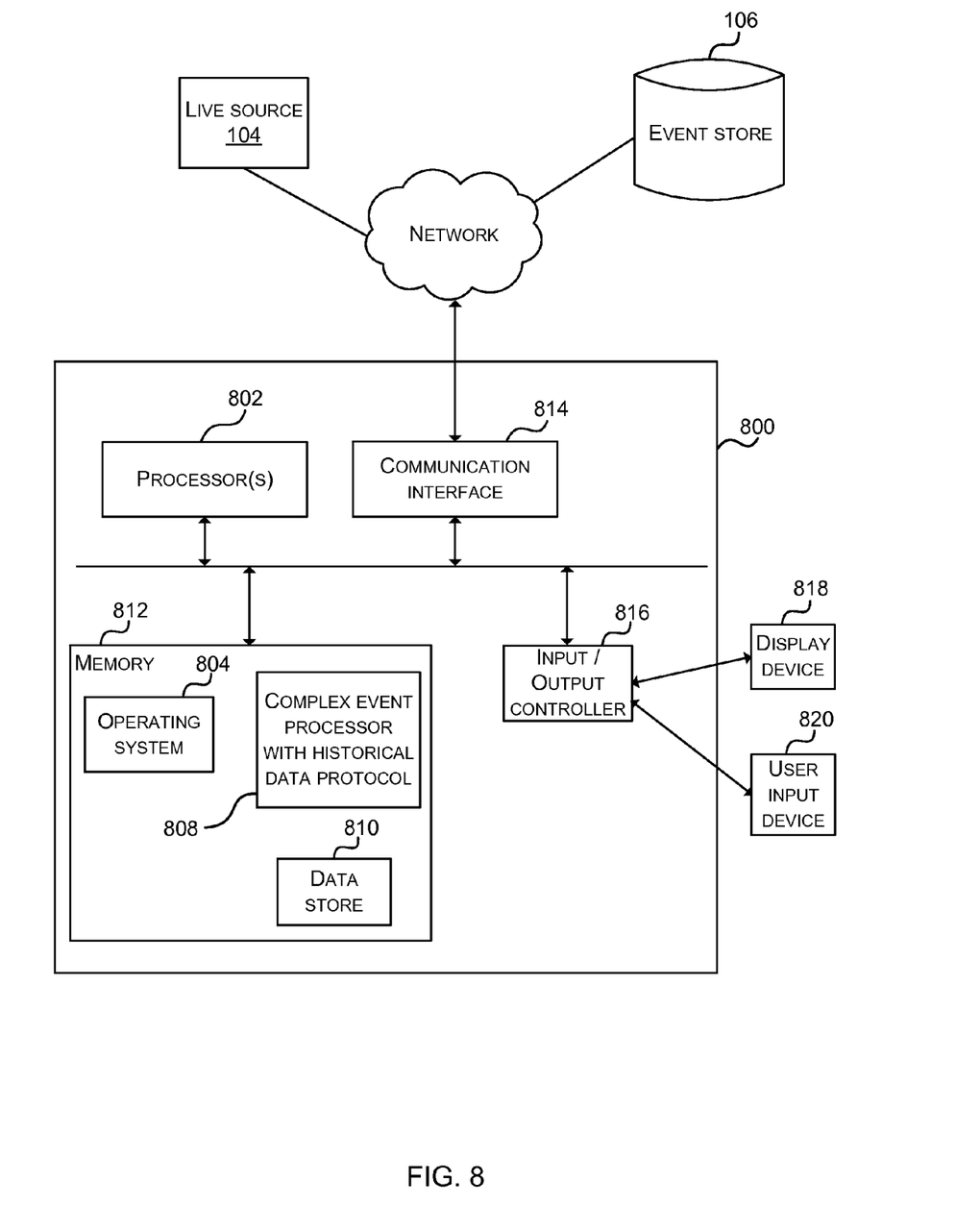
FIG. 8 illustrates an exemplary computing-based device in which embodiments of a complex event processor may be implemented.

FIG. 8 illustrates various components of an exemplary computing-based device 800 which may be implemented as any form of a computing and/or electronic device, and in which embodiments of a complex event processor with a protocol for combining historical event data and live/replayed event data may be implemented.

Computing-based device 800 comprises one or more processors 802 which may be microprocessors, controllers or any other suitable type of processors for processing computer executable instructions to control the operation of the device in order to combine historical event data and live/replayed event data using one or more of the methods of FIGS. 4 to 7. In some examples, for example where a system on a chip architecture is used, the processors 802 may include one or more fixed function blocks (also referred to as accelerators) which implement a part of the method of any of FIGS. 4 to 7 in hardware (rather than software or firmware). Platform software comprising an operating system 804 or any other suitable platform software may be provided at the computing-based device to enable application software to be executed on the device. All or part of a complex event processor 808 with an historical data protocol may be provided at memory 812. A data store 810 holds temporal combiner node functions, intermediate node inverse functions, historic event data, live/replayed event data, times, and other data.

The computer executable instructions may be provided using any computer-readable media that is accessible by computing based device 800. Computer-readable media may include, for example, computer storage media such as memory 812 and communications media. Computer storage media, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 812) is shown within the computing-based device 800 it will be appreciated that the storage may be distributed or located remotely and accessed via a network or other communication link (e.g. using communication interface 814). Communication interface 814 may be used to interface with a live/replayed event source 104 and an historical event store 106 via a communications network.

The computing-based device 800 optionally comprises an input/output controller 816 arranged to output display information to a display device 818 which may be separate from or integral to the computing-based device 800. The display information may provide a graphical user interface. The input/output controller 816 is also arranged to receive and process input from one or more devices, such as a user input device 820 (e.g. a mouse, keyboard, camera, microphone or other sensor). In some examples the user input device 820 may detect voice input, user gestures or other user actions and may provide a natural user interface (NUI). This user input may be used to specify functions for temporal combiner nodes, specify inverse function for intermediate nodes, define query plans, specify live/replayed event streams, specify historical event stores, and other purposes. In an embodiment the display device 818 may also act as the user input device 820 if it is a touch sensitive display device. The input/output controller 816 may also output data to devices other than the display device, e.g. a locally connected printing device.

Any of the input/output controller 816, display device 818 and the user input device 820 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In an example there is a complex event processor comprising:

a communications interface configured to retrieve event data from at least one event source by pulling it from the source and to receive data pushed to the communications interface comprising at least one live/replayed event stream; and an event processing pipeline connected to the communications interface and comprising a plurality of operator nodes connected between the communications interface and an operator node which is a combiner node configured to combine event data from the source and from the live/replayed event stream;

the communications interface being configured to retrieve events from the source and to push the events retrieved from the source along the event processing pipeline in a downstream direction from the communications interface towards the combiner node;

the communications interface configured to retrieve and push the events from the source only in response to request messages passed in an upstream direction from the combiner node to the communications interface along the pipeline.

For example, the combiner node is triggered to generate and send the request messages in response to receipt of the live/replayed stream at the combiner node.

For example, the request messages are reverse punctuation messages comprising at least one request time.

For example, one or more of the operator nodes each store an inverse function specifying how to alter one or more times in reverse punctuation messages received by the operator node.

For example, one or more of the operator nodes is configured to alter one or more times in reverse punctuation messages received by the operator node, and to generate and send an outgoing reverse punctuation message comprising the altered one or more times.

For example, the request messages comprise one or more times to be used to retrieve point and/or interval events from the source.

For example, the source is a store comprising an interval index and the request messages comprise one or more times to be used to retrieve point and/or interval events from the store, an interval event comprising a start edge event and an end edge event.

For example, the request messages comprise a number of events, or a volume of data, to be retrieved from the source.

For example, one or more of the operator nodes are configured to modify the number of events to be retrieved from the source on the basis of operations defined at the operator nodes.

For example, one or more of the operator nodes are configured, on receipt of an incoming request message, to generate and send zero, one or more outgoing request messages towards the communications interface, according to a difference between a record of retrieved event data received at an operator node and event data requested by the incoming request message.

For example, one or more of the operator nodes store a record of events received at the operator node.

For example, one or more of the operator nodes store a record of reverse punctuation messages received at the operator node and are configured to use the record of reverse punctuation messages to minimize sending duplicate reverse punctuation messages.

For example, the communications interface is configured to push the retrieved events by forming batches of the events.

In an example there is a method at a complex event processor comprising:

receiving at least one live/replayed event stream and pushing the live/replayed events to a combiner node in an event processing pipeline;

retrieving events from at least one event source and pushing the events retrieved from the source along the event processing pipeline in a downstream direction from a communications interface towards the combiner node; and combining the live/replayed event stream and the retrieved events at the combiner node;

wherein retrieving and pushing the retrieved events only occurs in response to request messages passed in an upstream direction from the combiner node to the communications interface along the pipeline.

In an example the method described immediately above comprises sending the request messages from the combiner node to the communications interface via one or more operator nodes, and at one or more of the operator nodes, altering one or more times in one of the request messages received by the operator node, and generating and sending one or more outgoing reverse punctuation messages comprising the altered one or more times.

For example the method comprises using one or more times in the request messages to retrieve point and/or interval events from the event source.

For example the method comprises sending the request messages from the combiner node to the communications interface via one or more operator nodes, and at one or more of the operator nodes, on receipt of an incoming request message, generating and sending zero, one or more outgoing request messages towards the communications interface, according to a difference between a record of retrieved event data received at the operator node and event data requested by the incoming request message.

For example the method comprises sending the request messages from the combiner node to the communications interface via one or more operator nodes, and at one or more of the operator nodes, storing a record of reverse punctuation messages received at the operator node and using the record of reverse punctuation messages to minimize sending duplicate reverse punctuation messages.

In an example there are one or more device-readable media with device-executable instructions that, when executed by a computing system, direct the computing system to perform steps comprising:

pushing live/replayed events to a combiner node in an event processing pipeline;

retrieving events from at least one event source and pushing the retrieved events to operator nodes connected between a communications interface and the combiner node in the event processing pipeline in a downstream direction from the communications interface towards the combiner node; and combining the live/replayed event stream and the retrieved historical events at the combiner node;

wherein retrieving and pushing the retrieved events takes into account results of a static analysis of the operator nodes between the communications interface and the combiner node.

For example the step comprise: computing amounts and/or timestamp criteria of retrieved event data to be used by operations at the operator nodes using the static analysis.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A system comprising:
at least one processor adapted to execute computer executable instructions associated with nodes of an event processing pipeline;
a communications interface communicatively coupled to the at least one processor and configured to:
pull first event data from at least one source in response to a request message; and
receive second event data pushed to the communications interface, the second event data associated with at least one live/replayed event stream; and
at least one computer-readable medium communicatively coupled to the at least one processor and nodes of the event processing pipeline stored on the computer-readable medium and executable by the processor, the nodes comprising:
a first group of operator node(s) connected between the communications interface and a combiner node, the first group of operator node(s) configured to provide third event data based at least in part on the first event data;
a second group of operator node(s) connected between the communications interface and the combiner node, the second group of operator node(s) configured to provide fourth event data based at least in part on the second event data; and
the combiner node configured to:
determine a request time based at least in part on at least some of the fourth event data;
provide the request message comprising the request time to the communications interface via the first group of operator node(s); and
combine at least some of the third event data and at least some of the fourth event data.

2. The system of claim 1, wherein the combiner node is configured to combine the at least some of the third event data and the at least some of the fourth event data by performing at least one of a join, temporal join, or union of the at least some of the third event data and the at least some of the fourth event data.

3. The system of claim 1, wherein the combiner node is further configured to determine a timestamp associated with at least some of the fourth event data and to determine the request time based at least in part on the timestamp.

4. The system of claim 1, wherein an operator node of the operator node(s) of the first group of operator node(s) is configured to:
receive the request message;
determine an altered request time based at least in part on the request time in the request message and a delay time introduced by the operator node;
determine an altered request message based at least in part on the request message and the altered request time; and
provide the altered request message to the communications interface in place of the request message.

5. The system of claim 4, wherein at least one of the operator node(s) is configured to alter the request time based at least in part on a stored inverse function.

6. The system of claim 1, wherein:
the source is configured to store the first event data associated with an interval index;
the request message comprises one or more times to be used to retrieve point and/or interval events from the store; and
an interval event comprises a start edge event and an end edge event.

7. The system of claim 1, wherein the request message further comprises at least one of data of a number of events of the first event data to be retrieved from the source or data of a volume of the first event data to be retrieved from the source.

8. The system of claim 7, wherein one or more of the operator node(s) of at least one of the first group of operator node(s) or the second group of operator node(s) are configured to modify the number of events to be retrieved from the source based at least in part on operations defined at the operator node(s).

9. The system of claim 1, wherein at least one operator node of the first group of operator node(s) is configured to:
store a record of events received from at the at least one operator node;
receive the request message;
determine event data to be retrieved based at least in part on a difference between the record of events received at the at least one operator node and event data requested by the request message; and
generate and send an outgoing request message towards the communications interface, the outgoing request message requesting at least some of the determined event data to be retrieved.

10. The system of claim 1, wherein at least one operator node of the first group of operator node(s) is configured to:
store a record of request messages received at the at least one operator node;
receive the request message; and
transmit the request message towards the communications interface based at least in part on the record indicating the request message is not a duplicate request message.

11. The system of claim 1, wherein an operator node of the first group of operator node(s) is further configured to:
determine a time at which to provide the request message to the communications interface, the time determined such that the communications interface pulls the first event data responsive to the request message at such a time that the third event data and fourth event data reaches the combiner node simultaneously.

12. A method comprising:
receiving, at a combiner node, an event batch pushed to the combiner node from a communications interface over an event pipeline, the event batch being formed by the event pipeline from a live/replayed event stream received from the communications interface and pushed downstream the event pipeline;
responsive to receiving the event batch, determining, by the combiner node and based on at least some data of the event batch, a request time;
providing, by the combiner node, a request message comprising the request time to the communications interface upstream the event pipeline;
receiving, at the combiner node, data of historical events pulled from at least one event source by the communications interface in response to the request message, the combiner node providing the request message at an injection time determined by the combiner node such that the combiner node simultaneously receives the data of historical events and data from the live/replayed events corresponding with the request message; and
combining, at the combiner node, at least some of the data of the live/replayed events and at least some of the data of the historical events.

13. The method of claim 12, wherein providing the request message from the combiner node to the communications interface upstream the event pipeline includes providing the request message to one or more operator nodes of the event pipeline, and the method of claim 12 further including:
determining an altered request time based at least in part on the request time in the request message and a delay time introduced by the one or more operator nodes, the determining including analyzing of a configuration of the one or more operator nodes; and
generating and sending an outgoing request message to the communications interface in place of the request message, the outgoing request message comprising the altered request time.

14. The method of claim 12, further comprising:
providing the request message from the combiner node to the communications interface via an operator node of the event pipeline; and
at the operator node storing a record of event data received at the operator node and, on receipt of the request message:
determining event data to be retrieved based at least in part on a difference between a record of received or retrieved event data pushed to the operator node and event data requested by the incoming request message, and
generating and sending an outgoing request message towards the communications interface, the outgoing request message requesting at least some of the determined event data to be retrieved.

15. The method of claim 12, the request message being one of a plurality of request messages and the method further comprising providing the plurality of request messages from the combiner node to the communications interface via an operator node of the event pipeline, and at the operator node:
storing a record of request messages of the plurality of request messages received at the operator node;
receiving the request message; and
transmitting the request message towards the communications interface based at least in part on the record indicating the request message is not a duplicate request message.

16. The method of claim 12, the request message configured to cause the communications interface to:
pull data of historical events from at least one event source, and
push the data of the historical events downstream the event pipeline to the combiner node.

17. One or more computer storage media storing computer-executable instructions that, when executed by a computing system, direct the computing system to perform steps comprising:
pushing, by a communications interface, live/replayed events downstream an events processing pipeline from the communications interface to a combiner node of the events processing pipeline;
determining, by the combiner node and from at least a first portion of the pushed live/replayed events, a request time corresponding to historical events to be combined at the combiner node with a second portion of the pushed live/replayed events;

sending, by the combiner node, a request message including the request time upstream to the communications interface to provoke the communications interface to pull the historical events from an event source and push the historical events downstream to the combiner node, the combiner node providing the request message at an injection time determined by the combiner node such that the combiner node simultaneously receives the historical events and the second portion of the pushed live/replayed events corresponding with the request message;

pulling the historical events, by the communications interface and according the request message at the communications interface, from at least one event source;

pushing, by the communications interface, the historical events downstream the events processing pipeline to the combiner node; and combining, by the combiner node, the second portion of the pushed live/replayed events and the historical events.

18. The one or more computer storage media of claim 17, the events processing pipeline including operator nodes and the steps further comprising:

determining the request time based at least in part on analyzing the operator nodes to determine delay times introduced by the operator nodes;

determining, by an operator node of the operator nodes, an adjusted time based at least in part on the request time;

determining, by the operator node, an adjusted request message including the adjusted request time; and pulling second historical events, by the communications interface and according to the adjusted request message instead of the request message, from the at least one event source based at least in part on the adjusted request time; and combining, by the combiner node, the second portion of the pushed live/replayed events and the second historical events.

19. The one or more computer storage media of claim 17, the determining including analyzing the events processing pipeline.

20. The one or more computer storage media of claim 17, the events processing pipeline including an operator node and the steps further comprising:

storing a record of events received at the operator node, the record of events reflecting events pushed to the combiner node from the communications interface through the operator node and events requested from the combiner node through the operator node to the communications interface;

receiving the request message;

determining event data to be retrieved based at least in part on a difference between the record of events pushed to the combiner node and events requested by the request message; and generating and sending an outgoing request message upstream towards the communications interface specifying event data that is requested by the request message and is not in the record of events pushed to the combiner node.

21. The one or more computer storage media of claim 17, the events processing pipeline including one or more operator nodes and the steps further comprising:

determining an altered request time based at least in part on the request time in the request message and a delay time introduced by the one or more operator nodes, the determining including analyzing of a configuration of the one or more operator nodes; and generating and sending an outgoing request message to the communications interface in place of the request message, the outgoing request message comprising the altered request time.

\* \* \* \* \*